US008688515B2

(12) United States Patent
Razzaque et al.

(10) Patent No.: US 8,688,515 B2
(45) Date of Patent: Apr. 1, 2014

(54) METHOD AND SYSTEM FOR SECURE DISTRIBUTION AND TRACKING OF INFORMATION VIA MULTIPLE SOCIAL NETWORKS

(75) Inventors: Brian Razzaque, Baltimore, MD (US);
Ben Sarsgard, Baltimore, MD (US);
Matthew Cook, Baltimore, MD (US);
Josh Glazer, Baltimore, MD (US);
Anne Sigman, Highland, MD (US);
Sarah Razzaque, Baltimore, MD (US);
Tracy Imm, Reisterstown, MD (US)

(73) Assignee: Social Toaster, Inc., Baltimore, MD (US)

( * ) Notice: Subject to any disclaimer, the term of this patent is extended or adjusted under 35 U.S.C. 154(b) by 0 days.

(21) Appl. No.: 13/040,854

(22) Filed: Mar. 4, 2011

(65) Prior Publication Data

US 2011/0218847 A1    Sep. 8, 2011

Related U.S. Application Data

(60) Provisional application No. 61/311,550, filed on Mar. 8, 2010.

(51) Int. Cl.
*G06Q 30/00* (2012.01)
(52) U.S. Cl.
USPC .................. 705/14.16; 705/14.19; 705/14.23; 705/14.1
(58) Field of Classification Search
USPC ............................................ 705/14.16, 14.73
See application file for complete search history.

(56) References Cited

U.S. PATENT DOCUMENTS

| 2005/0004837 | A1* | 1/2005 | Sweeney et al. ................. 705/14 |
| 2007/0150537 | A1 | 6/2007 | Graham |
| 2009/0192871 | A1 | 7/2009 | Deacon |

FOREIGN PATENT DOCUMENTS

| JP | 2008191750 A | 8/2008 |
| KR | 1020000049795 A | 8/2000 |

OTHER PUBLICATIONS

Jarvis, J., "Looking through the wrong end of the wire", Aug. 19, 2006, available online at buzzmachine.com.*

(Continued)

*Primary Examiner* — John G Weiss
*Assistant Examiner* — Scott C Anderson
(74) *Attorney, Agent, or Firm* — Toering Patents PLLC (57) ABSTRACT

A method and system for secure distribution and tracking of information and content of a third party via multiple social networks is described. The invention takes information and content marked to be promoted by a third party using an online application, and distributes and promotes the information to the social networks of everyone who is signed up as an 'ambassador' for that third party. When published, the information and content includes a personalized link associated with each ambassador to social network combination. Via the nature of social networks, this information is additionally redistributed into the users who are associated with those ambassadors in their social networks. As those users follow the personalized links back to the promoted information and content, the source ambassador to social network combination gets recorded and statistics about that user's viewing of the information and content are recorded. The online application records relevant statistics that the third party requires, and this information is then compiled into real time reports that detail the path that the promoted information and content traveled to drive users to the promoted information and content, as well as any resultant actions such as pages viewed, purchases made or items downloaded.

15 Claims, 8 Drawing Sheets

(56) References Cited

OTHER PUBLICATIONS

Crocker, "RFC 822, Standard for the Format of ARPA Internet Text Messages", University of Delaware, Aug. 13, 1982, archive maintained by the Internet Engineering Task Force, available online at ietf.org.*

* cited by examiner

METHOD AND SYSTEM FOR SECURE DISTRIBUTION AND TRACKING OF INFORMATION VIA MULTIPLE SOCIAL NETWORKS

CLAIM OF PRIORITY

The present application claims the benefit of U.S. Provisional Patent Application Ser. No. 61/311,550 filed on Mar. 8, 2010.

FIELD OF THE INVENTION

The present invention relates generally to systems and methods that facilitate distribution of information via multiple social networks and that track statistics resultant from the spread of that information.

BACKGROUND OF THE INVENTION

Online social networking sites have rapidly grown in the past few years, with millions of new users signing up every day. The online social network has become popular because of its ability to allow users to share their interests, activities and thoughts with other users of such social network. Examples of such social networks include Facebook, LinkedIn and Twitter. The massive platform for social interaction has allowed users (including individuals, small, mid sized and large businesses, educational organizations and federal and state governments), to maintain a direct line of communication with those who have common interests. For example, a user may post contact information, background information and other member-specific data, and then other users of the social network can view the posted data. The social network also allows users to create a group of members with a common interest. In general, the information that a user posts is able to be seen by other users that have a relationship to that user within a given social network.

Evolving from these recent developments is the field of social media. Under social media, traditional group message delivery, such as television, radio, billboards and so on, is replaced by creating content customized for, and sent directly to, the users with whom one user interacts via a social network. Although this concept in the non-digital world is simply a 'word of mouth' campaign, which is a very old idea, a social network allows an advertising user to distribute information to a set of other users of the social network with the purpose of promoting that information via the social network. Ideally, those users are connected to other users who see that information via the social network and choose to continue to promote the information to another set of connected users through the same social network.

In the past, much of the focus has been on how to create content that users will want to share for its own value. Users have had great success with various types of content, ranging from coupons to 'how to' articles to funny videos. Such content generally refers to content that is created and subsequently linked to users of a social network. Such content that is promoted by a user of a social network and is subsequently promoted by other users connected to such first user and then by other users connected to such subsequent users and so on, thus being shared to a large number of users in a short amount of time is said to have gone "viral", and typically is considered a successful marketing endeavor. However, this "viral" content has a few major setbacks. An advertising user generally has no control over whether or not content that such user attempts to promote will be spread by other users of the social network, regardless of how much time or money is spent. Additionally, if the content does get spread, there may be varied contextual surrounding to the content which may or may not actually hurt the advertising user. Finally, should the content spread in a positive format, the ability to track how it spreads and understand the value of the various networks is not likely possible. Without effectively deriving the value, there cannot be appropriate rewards associated with it.

Some methods have been developed to provide to a user the ability to create content and to send such content to other targeted members of his social network. For example, U.S. patent application Ser. No. 12/193,705 sets forth a system by which a user of a social network may inform other users about the actions of the first user in his group on a third party website, i.e., the user has purchased a particular item, will attend an event or has added a connection to a profile for a certain business. As a further example, U.S. patent application Ser. No. 12/495,396 sets forth a method of providing information to users of a social network by receiving an indicator of an action performed at a third party website by a first user. Promotional information is created and stored. Upon election by a first user to allow such information to be displayed to a second user with whom the first user interacts in a social network, the information is transmitted. The method is driven by the action of the first user, such as a purchase of shoes.

Accordingly, what is needed is a method and system for facilitating the distribution of information by a third party (such as a business or organization) in a targeted, customized and automated manner to users of multiple social networks, as well as a way to track statistics resultant from the spread of that information. What is further needed is the implementation of such method and system to significantly enhance online marketing campaigns.

SUMMARY OF THE INVENTION

Accordingly, a primary object of the present invention is to provide a method and system that allows a third party (such as a business or organization) to recruit users participating on various social networks to consistently participate in the promotion of the third party information to those users' social networks such that the resulting distribution and corresponding interest in the third party that is ultimately generated is able to be tracked in detail, preserving relationship information, and providing for reporting and statistical information to be gathered. The methods and systems can be implemented by use of an online software application.

The online application is used by the third party to allow for registration of ambassadors of such third party. Ambassadors are individuals who have an interest in the third party, whether its business, products or otherwise. Such ambassadors voluntarily access the online application and grant various levels of permission to the third party to assist the third party in promoting information to the users of the social network of which the ambassador is a user. During the registration process, the ambassador authorizes the online application to promote content from the third party to his various social networks.

In one embodiment, the online application prompts the ambassador to create an ambassador account and password. The online application prompts the ambassador to identify the various social networks of which he is a user and desires to allow distribution of information of the third party. The ambassador may select to allow various levels of distribution of information. For example, the ambassador may select to automatically distribute and post all information for the third party to the applicable social network account, or may select to review and approve all information for the third party prior to completing the distribution and posting.

The third party uses the online application to provide information desired to be promoted by the third party, and to distribute such information to each authorized social network account of each ambassador for that third party. For example, if an ambassador allows access to his Facebook and Twitter social network accounts, then the third party uses the online application to distribute the third party information to such ambassador's Facebook and Twitter social network pages.

When the information is distributed, the transmittal includes a personalized link associated with each ambassador to social network combination. Via the nature of social networks, this information is additionally distributed into the news feeds of users who are associated with those ambassadors in their social networks.

As those users of the social networks follow the personalized links back to the information, the source ambassador to social network combination is recorded, and statistics about that social network user's viewing of the information are recorded. The online application records relevant statistics regarding the information viewed, purchases made, or items downloaded. The online application may also record statistics regarding donations made or coupons downloaded. Any activity performed in following the personalized link is able to be tracked. This information is then compiled into real time reports that detail the path that the information traveled to drive users to the information, as well as any resultant actions such as pages viewed or purchases made.

As such, this online system provides end to end process tracking from the initial creation of information, to the dissemination over multiple social networks, to the conversion of sales and referrals directed by that information. This method and system allows for compensation based rewards for social marketing which is unrivaled by any existing service.

BRIEF DESCRIPTION OF THE FIGURES

Other objects and advantages of the invention will become apparent from a study of the following specification when viewed in light of the accompanying drawings, in which.

DETAILED DESCRIPTION

The embodiments herein provide a method and system that allows a third party (such as a business or organization) to securely distribute and track information to users of multiple social networks, and to track and reward based on statistics resultant from the spread of that information. Referring to the drawings generally, the methods and systems can be implemented by use of an online computer software application operated from a computing device.

Figure 1:
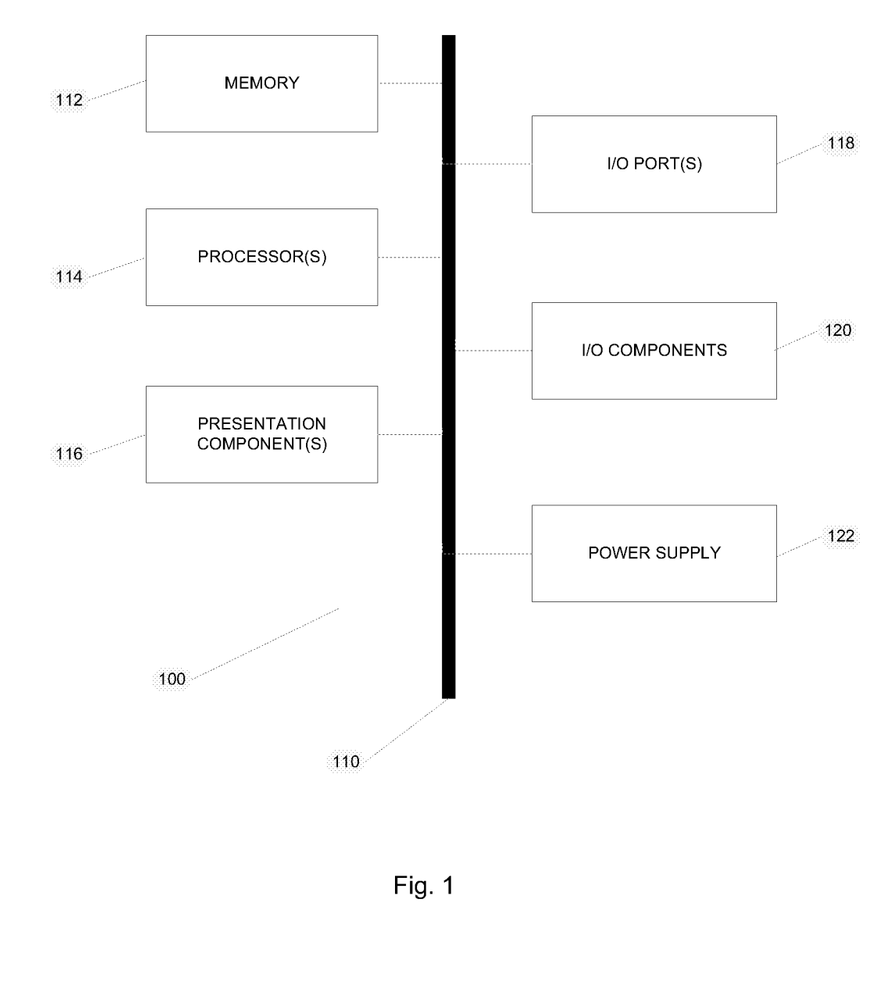
FIG. 1 is a diagram of a computing device for use with the invention.

Referring to FIG. 1, a computing device 100 includes a bus 110 that directly or indirectly couples the following devices: memory 112, one or more processors 114, one or more presentation components 116, input/output (I/O) ports 118, I/O components 120 and a power supply 122. This is an exemplary computing device that can be used in connection with the embodiments of this invention. Computing devices may include a desktop computer, a laptop or handheld device. It may also refer to a server, whether a physical server for use as a web or database server, or a virtual server, such as may reside in a virtual environment or cloud.

Figure 2:
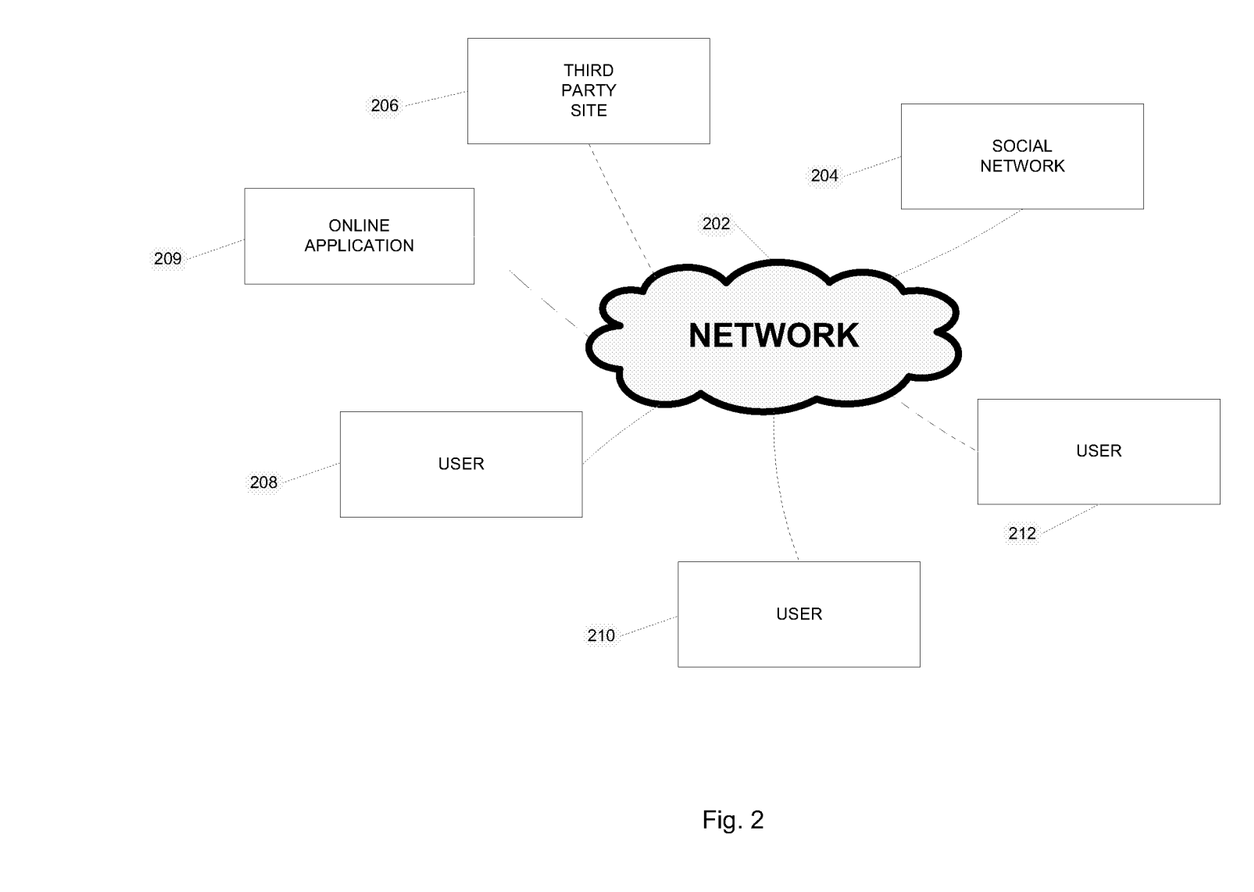
FIG. 2 is a diagram of a network and corresponding connections by a user, a social network, a third party site, and the online application.
Figure 2A:
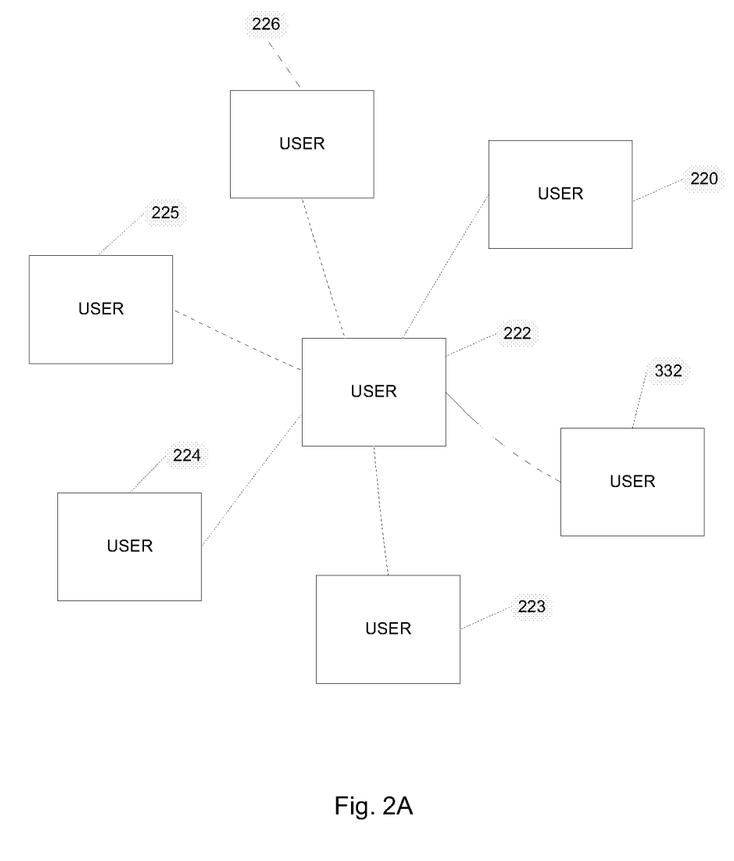
FIG. 2a is a diagram showing how an individual user is connected to other users within the context of a social network.

Referring to FIGS. 2 and 2a, social networks allow users to form connections with other users in the social network. One or more users 208, 210, 212 connect to the social network using a computing device 100. Examples of social networks include Facebook, LinkedIn and Twitter. Users create profiles on the social network that include information about the user, such as biographical information, interests, hobbies or educational information. User profiles also include photographs, audio and video information.

Users of a social network can connect with other users of the social network, for example, because of a shared common interest. A user 222 can connect with other users 220, 221, 223, 224, 225, and 226 on an individual basis. Such user 222 of a social network can initiate this connection on an individual basis by issuing a request to another user 220 to create the connection. Upon the other user's acceptance of this request, the users are associated with one another. This operation can be repeated by the user 222 to associate with the other users 220, 221, 223, 224, 225 and 226.

Figure 3:
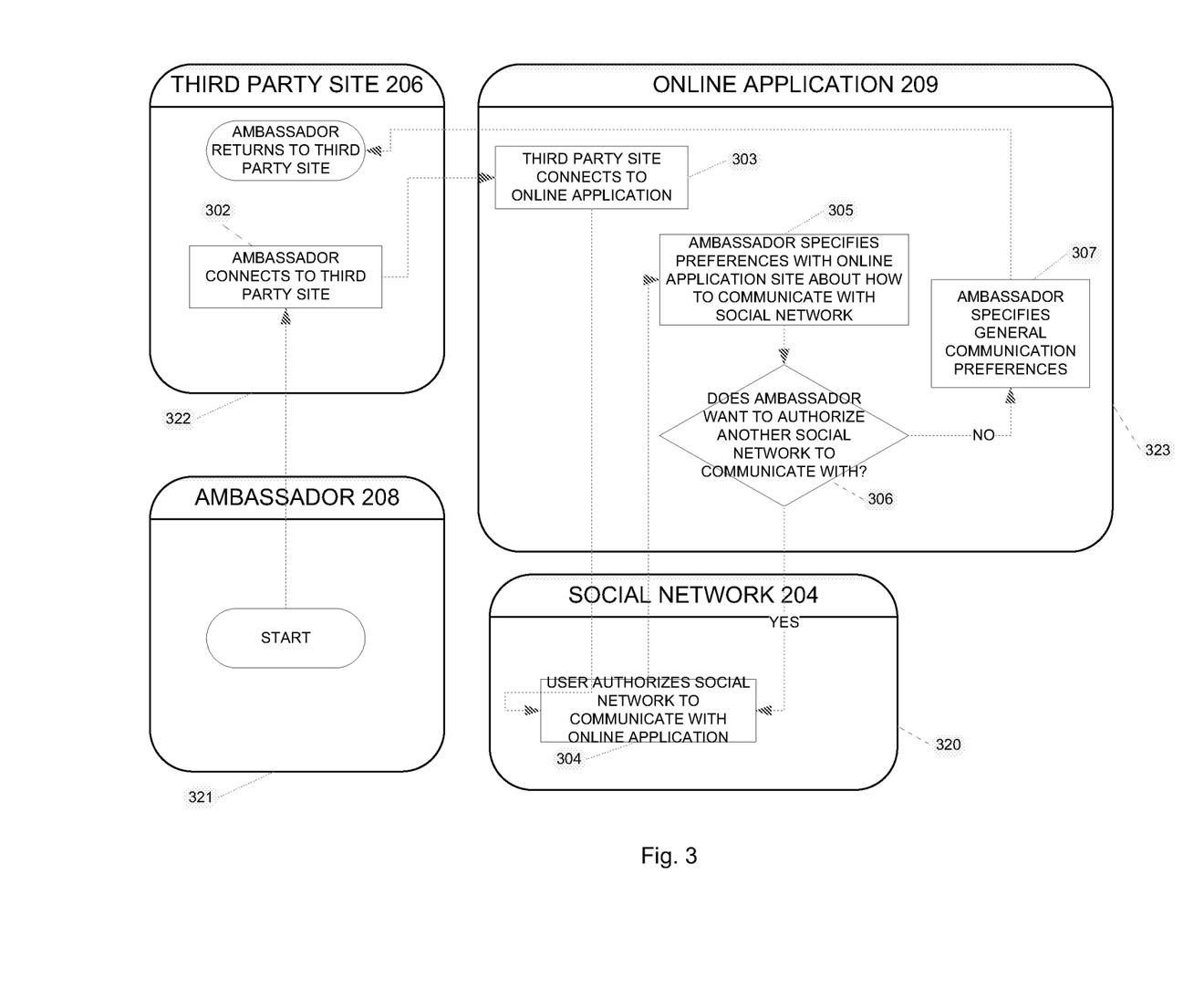
FIG. 3 is a diagram of the ambassador registration process.

Referring to FIGS. 2 and 3, the online application is used by the third party to allow for registration of ambassadors of such third party. An ambassador is an individual who, for any reason, wishes to grant to the third party 206 the ability to use the online application 209 to distribute and promote information and content to such ambassador's accounts on the various social networks 204 of which the ambassador is a user. The ambassadors access through a network to a third party site 206 and the online application 209. An ambassador accesses the third party site 302 and accesses, either directly or indirectly, the online application 303 authorizing it to connect with a specific social network on which the ambassador has an account 304. Once the authorization is completed, the ambassador indicates the preferences that the ambassador has for communicating third party information to the applicable social network 305, such as whether or not the ambassador wants information to automatically post on his behalf after the ambassador is notified, or if the ambassador wants to explicitly authorize each promotion. Notifications may be submitted via electronic mail but are not limited to electronic mail. Once preferences are established for the ambassador for a given social network, the online application prompts the ambassador to indicate if he wishes to authorize an additional social network 306. If the ambassador desires to do so, he repeats the authorization and preference setting process. If not, he is prompted to establish global communication preferences 307, such as how frequently the ambassador wishes to help promote the third party information and content, or what type of information and content the ambassador wishes to help promote.

Figure 4:
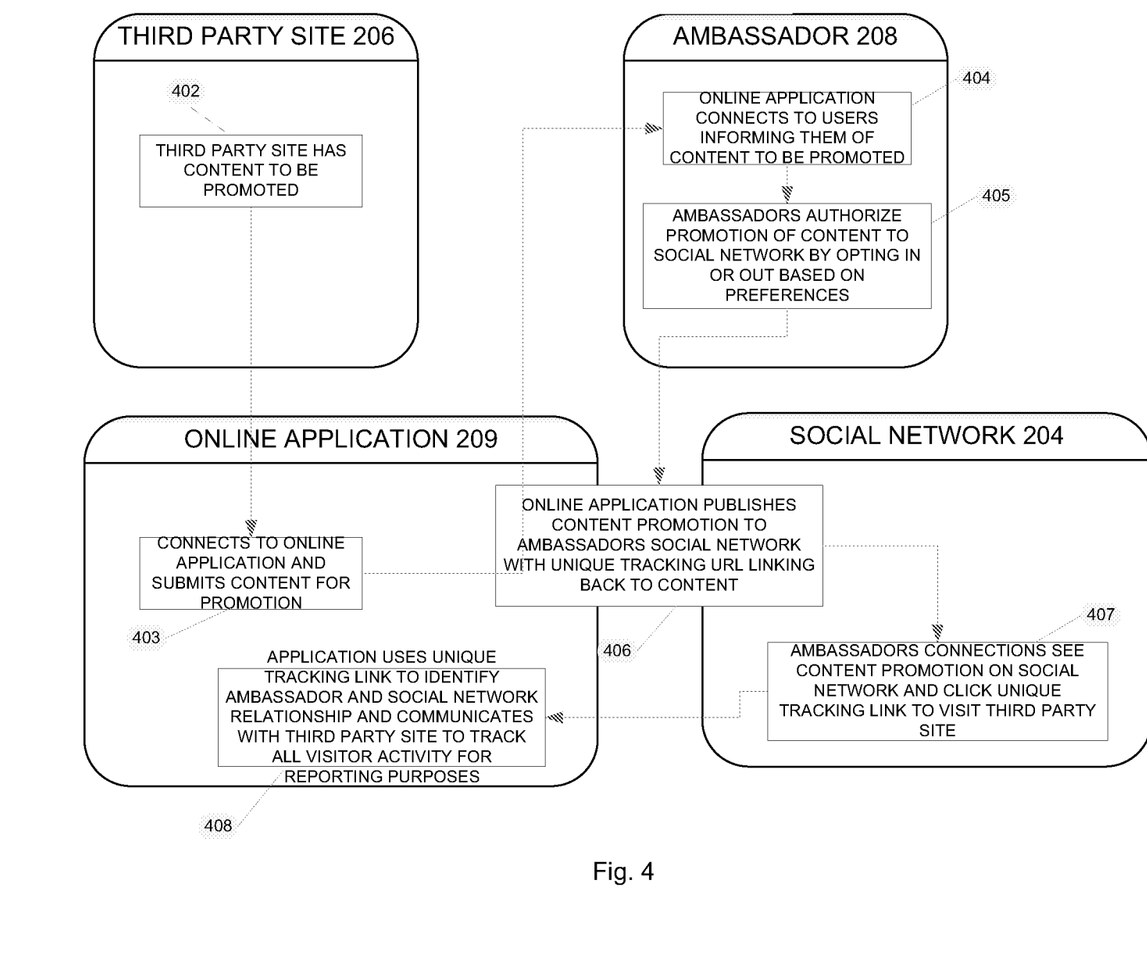
FIG. 4 is a diagram of the information distribution and tracking process.
Figure 5:
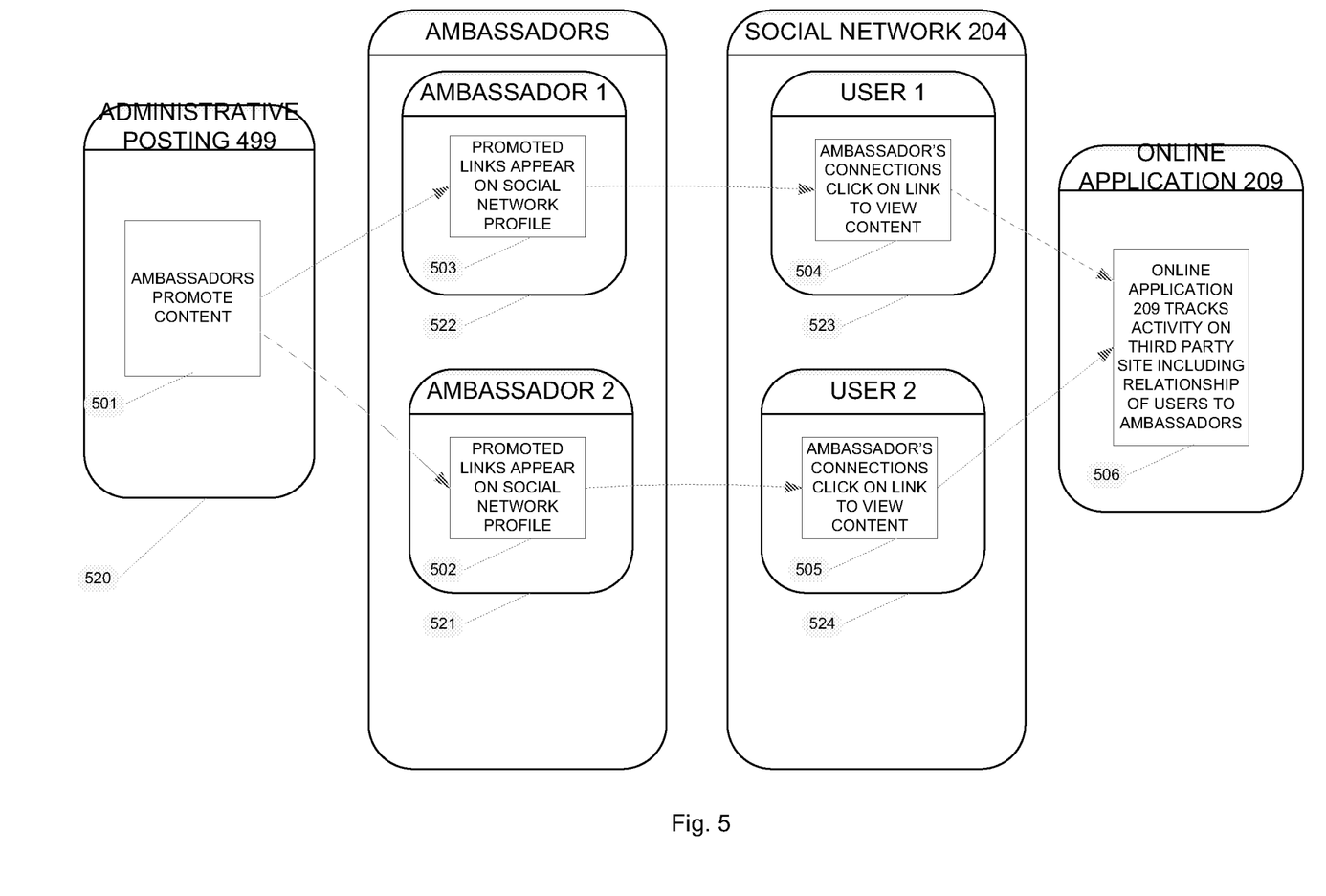
FIG. 5 is a diagram of the ambassador to social network links.

The online application allows the third party (for example, the administrator of such third party) to distribute and promote information and content directly to the social networks of the ambassadors. After time, a large group of ambassadors who have already authenticated their social network with the online system will result. Referring to FIGS. 4 and 5, at either the leisure of the administrator or on a timed schedule, information can be distributed to the database of ambassadors 402. This distribution is based on the previously established preferences established by each ambassador. The mechanism for the promotion may be one of any number of means, including, but not limited to, promotion from the third party site directly by connecting to the online application, by use of a plug-in for the third party site provided by the online application, or by manually promoting an individual uniform resource locator ("URL") directly from within the online application 403. The online application, based on specified ambassador preferences, communicates to each ambassador that there is new content to be promoted to his social network 404. This communication may be, for example, by electronic mail, prompting the ambassador to approve the proposed information and content 405. In one alternative, the ambassador may have specified a preference that information and content be automatically promoted after notifying him of the pending promotion and providing him with the option to opt-out of the promotion. Once the ambassador has approved the content, the online application connects to the social network for the ambassador and distributes the information and content, along with a unique URL that is specific to the ambassador, the social network, and the distributed content 406. When distributed in this manner, other users that are connected to the ambassador on a social network can see the information and are able to click on the unique URL 407. Clicking on this link provides the online application with tracking information regarding the source of the user and the relationship to the ambassador and social network, and this tracking information is subsequently carried throughout the third party site, providing for detailed tracking and reporting on all activities of the use on the third party site 408.

Referring to FIG. 5, information that is distributed by the third party via the online application to the social networks 501 is promoted to the social networks of a number of ambassadors 521 and 522. The promoted information appears as links 502 and 503 associated with these ambassadors that are visible to the users 523 and 524 that are connected to the ambassadors on a social network. Any number of connected users are then able to click on the unique URLs associated with their ambassador connection and follow it to view the associated distributed information 504 and 505. Clicking on this link provides the online application with unique identifying information about each user and provides for the ability for the online application to track all subsequent activity that each user takes on the third party site that they visit 506.

Figure 6:
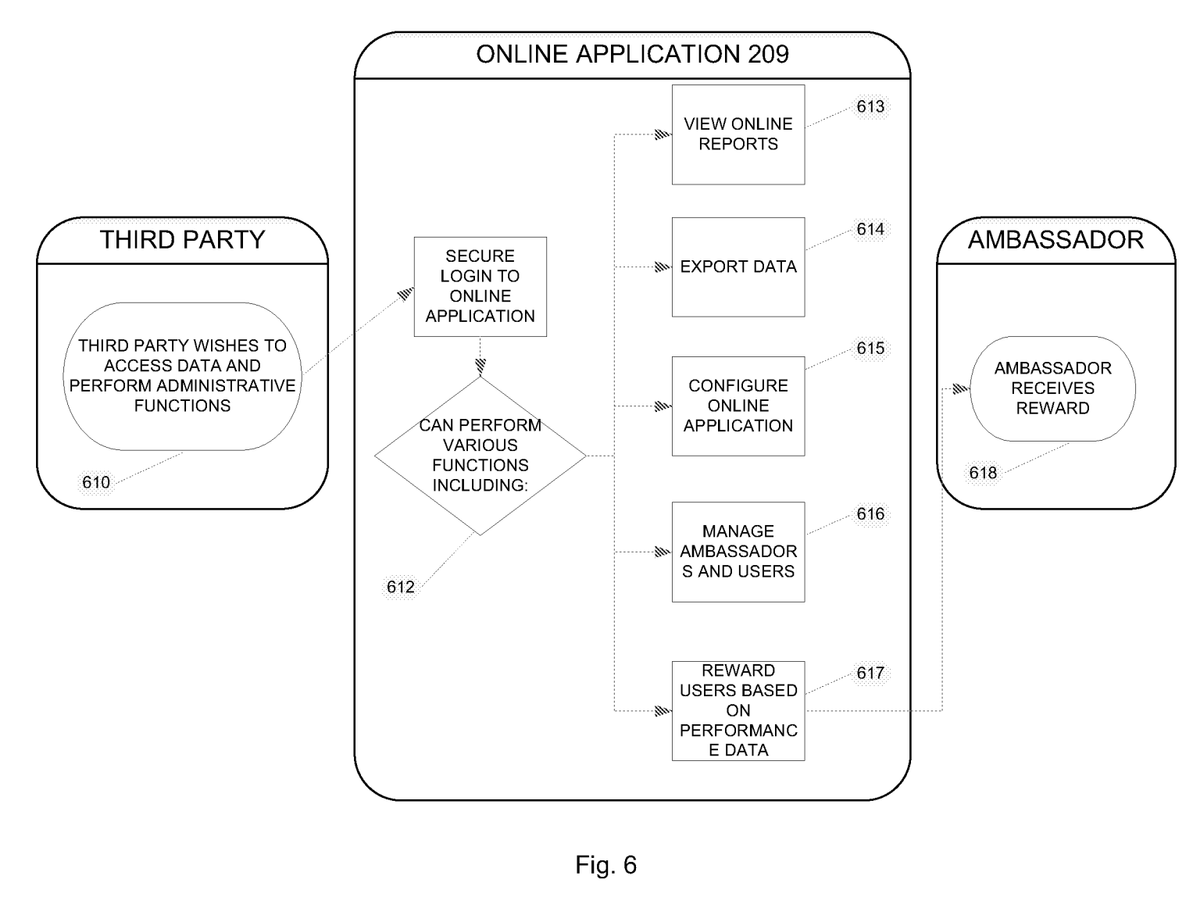
FIG. 6 is a diagram of the information tracking process.

Referring to FIG. 6, when a third party wishes to access statistical information or perform other administrative functions associated with the online application 610, such third party connects securely to the online application and accesses it using secure login credentials previously provided, a username and password, for example 611. Once the third party has logged in, it is able to choose to perform a variety of different functions 612, including, but not limited to, viewing online report 613, exporting data in a variety of formats 614, configuring administrative settings of the online application 615, managing ambassadors and preferences 616, and rewarding ambassadors based on performance statistics 617. The ability to reward ambassadors is provided for by the online application because of the data that is collected, which preserves the relationship between a referred user of a social network and the ambassador, and because of the tracking of activity performed by the user of the social network. The third party can therefore use the online application to reward ambassadors by communicating through the online application to them to provide them with their reward, for example an online coupon, based on specific metrics being achieved 618.

Figure 6A:
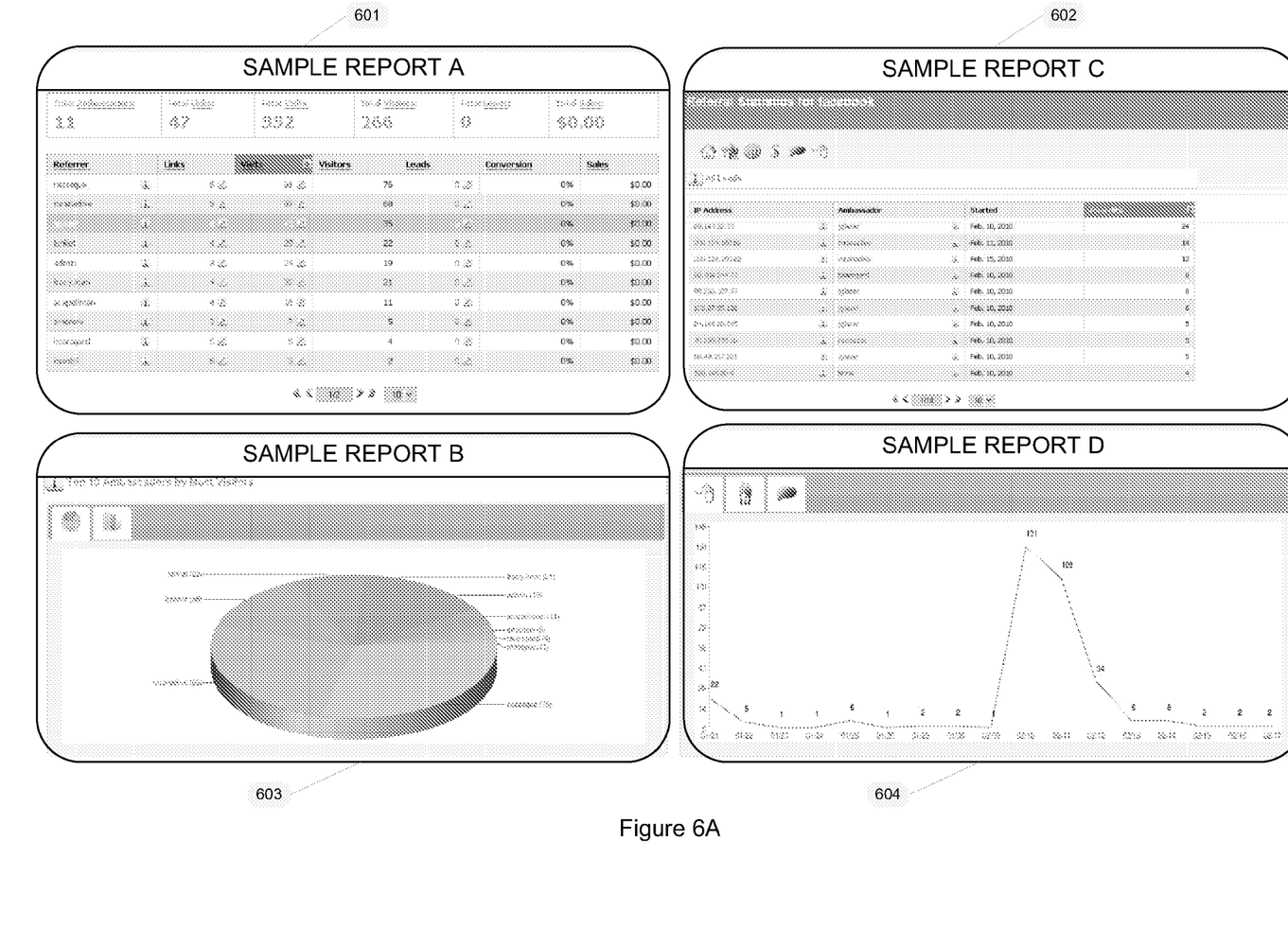
FIG. 6A is an exemplary report of information tracking.

Referring to FIG. 6a, the third party is able to connect to the online application to access this statistical data in the form of formatted reports, exportable data feeds, and other such means. Data may be provided in the form of well-formatted reports 601, 602, 603, and 604.

While the preferred forms and embodiments of the invention have been illustrated and described, it will be apparent to those of ordinary skill in the art that various changes and modifications may be made without deviating from the inventive concepts set forth above.

What is claimed is:

1. A method for third party tracking of information relating to social network interaction, comprising the steps of:
    registering, via a hardware computing device, at least one ambassador of a third party, wherein the at least one ambassador is a user of a first social network and of a second social network, wherein the first social network is different from the second social network, wherein the first social network and the second social network each comprise a plurality of connections defining relationships between a particular user and a subset of other users;
    receiving, via the hardware computing device, an authorization from the at least one ambassador to distribute content over the first social network and the second social network via the at least one ambassador, wherein the content is associated with the third party;
    distributing, via the hardware computing device, a personalized link to the content to the first social network and the second social network, wherein the personalized link uniquely identifies the ambassador as the distributor of the personalized link and also identifies the first social network or the second social network over which the personalized link is distributed; and
    receiving, via the hardware computing device, information regarding views of the content by a plurality of users of the first social network or the second social network, wherein the plurality of users are connections of the ambassador in the first social network or the second social network.

2. The method of claim 1, wherein said ambassador registers via an online application.

3. The method of claim 2, wherein said online application enables said ambassador to select levels of distribution of said content.

4. The method of claim 2, wherein said online application enables said ambassador to select preferences for communicating content to the first social network or the second social network.

5. The method of claim 1, wherein said receiving information regarding views of the content further comprises receiving information relating to a purchase made, an item downloaded or a donation made.

6. The method of claim 1, further comprising compiling statistical information and reports detailing a path traveled by the content to the plurality of users of the first social network or the second social network and actions taken by the plurality of users in response to the content.

7. The method of claim 6, and further comprising assigning a unique tracking link to the path traveled by the content.

8. The method of claim 7, wherein said statistical information and reports reflect initial transmission of content, dissemination of the content over the first social network or the second social network, and sales and referrals resulting from the content via the first social network or the second social network.

9. The method of claim 8, and further comprising providing rewards to said ambassador in accordance with actions taken by the users in response to the content.

10. The method of claim 1, further comprising:
communicating, via the hardware computing device, a notification to the at least one ambassador indicating that there exists content to be distributed to at least one of the first social network or the second social network; and
automatically distributing the personalized link to the content to the first social network and the second social network after receiving the notification.

11. A system for secure distribution and tracking of information relating to social network interaction, comprising
at least one hardware computing device configured to:
host content;
register an ambassador, wherein the ambassador is a user of a first online social network and of a second online social network, wherein the first online social network is different from the second online social network, wherein the first social network and the second social network each comprise a plurality of connections defining relationships between a particular user and a subset of other users;
receive an authorization from the ambassador to distribute the content over the first online social network and the second online social network via the ambassador;
provide access to the content to a plurality of users of the first online social network or the second online social network via a personalized link to the content distributed to the first online social network and the second online social network, wherein the personalized link uniquely identifies the ambassador as a distributor of the personalized link and also identifies the first online social network or the second online social network over which the personalized link is distributed; and
track access, by the plurality of users, of the content provided via the personalized link associated with the ambassador, wherein the plurality of users are connections of the ambassador in the first online social network or the second online social network.

12. The system of claim 11, wherein said online application enables each ambassador registered therewith to select preferences for communicating content to the first online social network or the second online second social.

13. The system of claim 11, wherein the track access of the content comprises compiling statistical information and reports detailing a path traveled by the content to the plurality of users of the first online social network or the second online social network and actions taken by the plurality of users in response to the content.

14. The system of claim 13, wherein said statistical information and reports reflect initial transmission of content, dissemination of the content over the first online social network or the second online social network, and sales and referrals resulting from the content via the first online social network or the second online social network.

15. The system of claim 11, wherein the at least one hardware computing device is further configured to determine rewards to said ambassadors in accordance with actions taken by the users in response to the content.

* * * * *